United States Patent
Loganathan et al.

(10) Patent No.: US 10,068,617 B2
(45) Date of Patent: Sep. 4, 2018

(54) ADDING CONTENT TO A MEDIA TIMELINE

(71) Applicant: Microsoft Technology Licensing, LLC, Redmond, WA (US)

(72) Inventors: Sivakumar Loganathan, Sunnyvale, CA (US); Deepak Ponraj, Fremont, CA (US); Puneet Sethi, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/040,292

(22) Filed: Feb. 10, 2016

(65) Prior Publication Data

US 2017/0229152 A1 Aug. 10, 2017

(51) Int. Cl.
*H04N 9/80* (2006.01)
*G11B 27/34* (2006.01)
*G11B 27/036* (2006.01)
*G06F 17/24* (2006.01)
*G11B 27/36* (2006.01)
*G06F 17/30* (2006.01)
*G06F 3/0482* (2013.01)

(52) U.S. Cl.
CPC .......... *G11B 27/34* (2013.01); *G06F 17/241* (2013.01); *G06F 17/30828* (2013.01); *G11B 27/036* (2013.01); *G11B 27/36* (2013.01); *G06F 3/0482* (2013.01); *G06F 17/30867* (2013.01)

(58) Field of Classification Search
USPC ................................................ 386/239–248
See application file for complete search history.

(56) References Cited

U.S. PATENT DOCUMENTS

| 5,600,775 | A | 2/1997 | King | |
|---|---|---|---|---|
| 8,984,405 | B1 * | 3/2015 | Geller | G11B 27/34 715/230 |
| 9,031,382 | B1 * | 5/2015 | Kaiser | G11B 27/00 386/248 |
| 9,098,503 | B1 | 8/2015 | Johnson | |
| 9,684,432 | B2 * | 6/2017 | Fink | G06F 3/0482 |
| 2006/0053364 | A1 * | 3/2006 | Hollander | G06F 17/241 715/232 |

(Continued)

OTHER PUBLICATIONS

U.S. Appl. No. 15/053,909, filed Feb. 25, 2016, Office Action, dated Aug. 21, 2017.

(Continued)

*Primary Examiner* — Hung Dang
(74) *Attorney, Agent, or Firm* — Hickman Palermo Becker Bingham LLP; Daniel D. Ledesma

(57) ABSTRACT

Techniques are provided for associating comments with certain positions within a video (or audio) timeline. Multiple users compose comments, such as questions, and cause those comments to be stored in association with the video. Each comment is stored in association with a specific point or section in the video timeline. Later, another user can view the comments and select a particular comment, which causes the video to be played at the position in the timeline associated with the particular comment. Additionally or alternatively, playing a particular portion of a video may cause one or more comments that are associated with the particular portion to be displayed.

21 Claims, 5 Drawing Sheets

(56) References Cited

U.S. PATENT DOCUMENTS

| | | | |
|---|---|---|---|
| 2007/0245243 A1* | 10/2007 | Lanza | G06F 17/30817 715/723 |
| 2007/0266304 A1* | 11/2007 | Fletcher | G06F 17/241 715/230 |
| 2008/0077583 A1* | 3/2008 | Castro | G06F 17/3028 |
| 2009/0128580 A1 | 5/2009 | Meier | |
| 2009/0327856 A1* | 12/2009 | Mouilleseaux | G06F 17/30781 715/230 |
| 2010/0023851 A1* | 1/2010 | Schormann | G06Q 10/10 715/232 |
| 2010/0070878 A1 | 3/2010 | Amento | |
| 2011/0131299 A1 | 6/2011 | Sardary | |
| 2012/0151345 A1* | 6/2012 | McClements, IV | G06Q 10/101 715/716 |
| 2012/0151348 A1 | 6/2012 | Mital | |
| 2014/0019843 A1* | 1/2014 | Schmidt | G06F 17/241 715/230 |
| 2014/0089800 A1* | 3/2014 | Kao | H04N 21/4756 715/719 |
| 2014/0089801 A1 | 3/2014 | Agrawal | |
| 2014/0115441 A1* | 4/2014 | Badoiu | G06F 17/3082 715/230 |
| 2014/0161416 A1* | 6/2014 | Chou | H04N 5/91 386/241 |
| 2014/0270692 A1* | 9/2014 | Suzuki | H04N 9/87 386/230 |
| 2015/0243276 A1 | 8/2015 | Cooper | |
| 2015/0264272 A1 | 9/2015 | Burns | |
| 2016/0224672 A1* | 8/2016 | Bindal | G06F 17/30867 |
| 2017/0110156 A1 | 4/2017 | Markan | |
| 2017/0257413 A1 | 9/2017 | Markan | |

OTHER PUBLICATIONS

Loganathan, U.S. Appl. No. 15/053,909, filed Feb. 25, 2016, Final Office Action, dated Feb. 2, 2018.

* cited by examiner

ADDING CONTENT TO A MEDIA TIMELINE

TECHNICAL FIELD

The present disclosure relates to processing user comments related to a media item, and, more specifically, to associating user comments with a timeline of the media item.

BACKGROUND

The Internet has facilitated the wide distribution and consumption of digital content, such as video and audio. Content providers or content distributors may provide a digital forum where consumers of the digital content can rate or provide comments about a specific content media item. In one approach, a content provider provides a content platform where viewers can request and view video items. If a viewer has a comment or a question about a video item, then the viewer may type in the comment or question, which the content platform stores. Later, the same viewer or other viewers of the video item may see the same comment or question.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for associating comments with certain positions within a video (or audio) timeline. Multiple users compose comments, such as questions, and cause those comments to be stored in association with the video. Each comment is stored in association with a specific point in the video timeline. Later, another user can view the comments and select a particular comment, which causes the video to be played at the position in the timeline associated with the particular comment. Additionally or alternatively, playing a particular portion of a video may cause one or more comments that are associated with the particular portion to be displayed.

One benefit of associating (or linking) comments to different positions within a video timeline is that it is easier to understand the comments when the comments are linked to their corresponding video portions. Another benefit is that searching comments becomes easier as the comments in a search result are for a particular portion of a video.

System Overview

Figure 1:
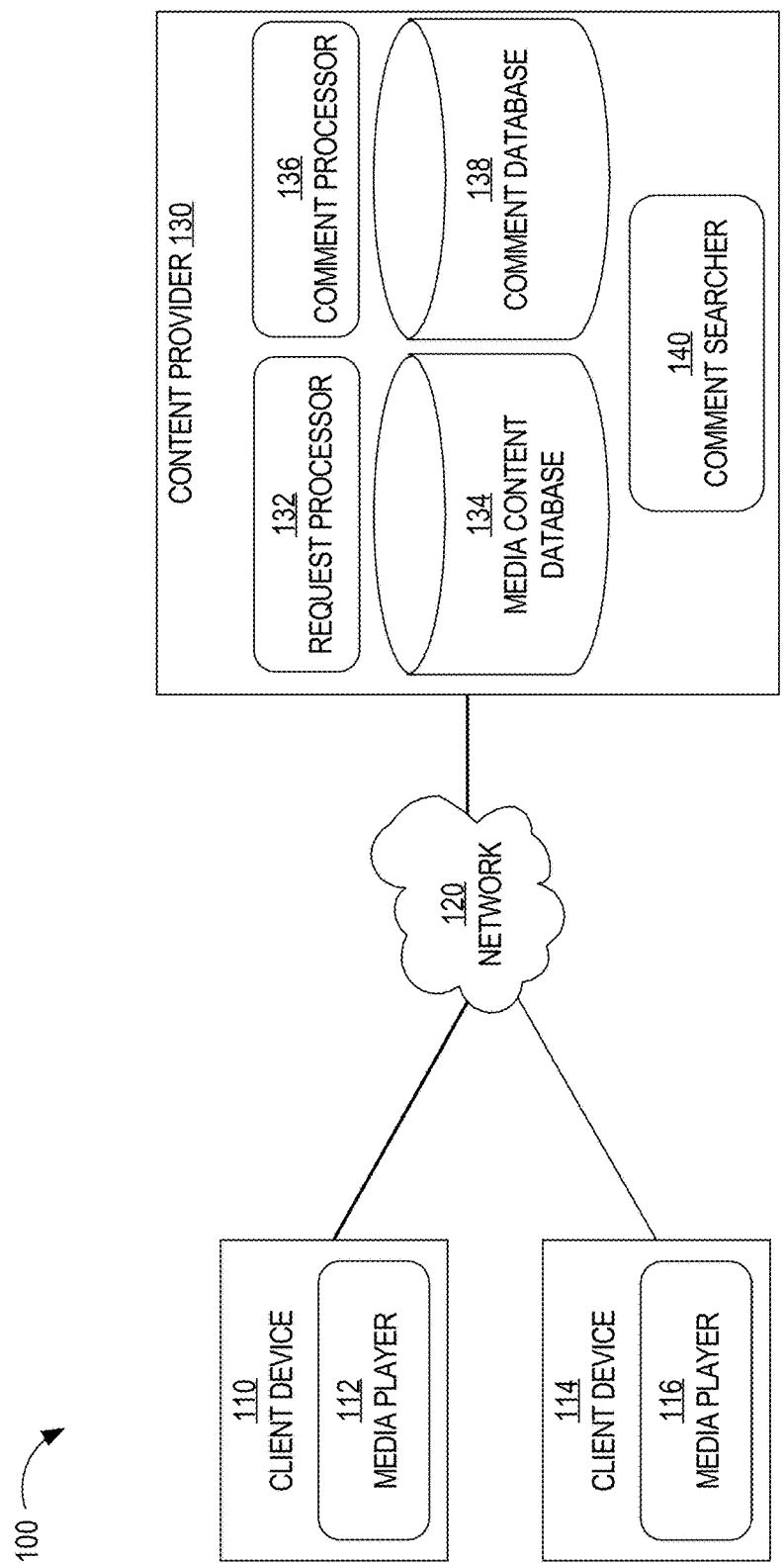
FIG. 1 is a block diagram that depicts an example system for retrieving and analyzing user interactions with video or audio, in an embodiment.

FIG. 1 is a block diagram that depicts an example system 100 for retrieving and analyzing user interactions with video or audio, in an embodiment. System 100 includes client devices 110 and 114, network 120, and content provider 130. While only two client devices is depicted, system 100 may include many more client devices that are communicatively coupled to content provider 130 over network 120.

Examples of client devices 110 and 114 include a laptop computer, a tablet computer, a desktop computer, a television box (Apple TV™ or Android TV), and a smartphone. A client device may include many applications and capabilities that are unrelated to video playing, such as a contacts manager, a web browser, a camera, games, a word processor, a flashlight, etc.

Client device 110 includes a media player 112 (and client device 114 includes a media player 116) that plays video by causing multiple video frames (rendered from video data) to be displayed on a screen of client device 110. Additionally or alternatively, media player 112 plays audio Media player 112 may be able to process audio/video data that is in only one audio/video file format file or audio/video data that is in multiple file formats. Example video file formats include .webm, .wmv, .ogv, .avi, and .mov. Example audio file formats include .wav, .mp3, and .aiff.

Media player 112 may be an application that executes on client device 110 as a stand-alone application. Alternatively, media player 112 executes within a web browser (or another application executing on client device 110) that is used to connect to content provider 130. Alternatively, media player 112 is embedded within an application (e.g., a "mobile" application). In either scenario, media player 112 may read audio/video data (that is stored locally) from one or more audio/video files or receive and play streaming audio/video data from a remote source (e.g., content provider 130).

Subsequent references to "media player 112" may include an application that includes multiple software components, among which is a video player component that is configured to process video data and display video.

Media player 112 includes controls to play, stop, pause, rewind, and/or forward video, and, optionally, playback speed (e.g., 1.5× or 2×). The controls may also include controls to adjust parameters, such as brightness and contrast of the displayed video. The controls may also include controls to adjust volume of audio that is played concurrently with any video.

Media player 112 includes a comment creator 113 that creates comments based on user input received through an interface of client device 110, such as a touchscreen of client device 110, a mouse that is connected to client device 110, or a microphone that detects audio and that is embedded in, or connected to, client device 110.

Network 120 may be implemented on any medium or mechanism that provides for the exchange of data between client device 110 and content provider 130. Examples of network 120 include, without limitation, a network such as a Local Area Network (LAN), Wide Area Network (WAN), Ethernet or the Internet, or one or more terrestrial, satellite or wireless links.

Content Provider

Content provider 130 includes a request processor 132, a media content database 134, a comment processor 136, and a comment database 138, and a comment searcher 140. Each of request processor 132, comment processor 136, and comment searcher 140 is implemented in software, hardware, or any combination of software and hardware. Also, while each of media content database 134 and comment database 138 is depicted as a single entity, each database may comprise multiple storage devices that are locally or globally distributed.

Request processor 132 receives, from client devices 110 and 114 over network 120, requests for digital content items that are stored in media content database 134. Example requests include Hypertext Transfer Protocol (HTTP) requests. The requests may originate at video players 112 and 116 in response to user input.

Media content database 134 stores one or more digital content items, such as audio items and video items. Each digital content item comprises one or more video or audio files that correspond to a single logical content item. If media content database 134 stores multiple content items, then all the content items may be provided by a single entity or party. Alternatively, some content items in media content database 134 may be provided by one entity or party and other video items in media content database 134 may be provided by another entity or party. Each entity uses content provider 130 as a distribution platform for distributing its respective content items.

Comment Data

Users of client devices 110 and 114 provide comments that comment creators 113 and 117 use to create comment data. The users may have provided voice or text input (e.g., selecting keys on a physical or graphical keyboard) that is converted into a series of digital textual characters or into audio data. Examples of types of user comments include statements, questions, and answers (to a question provided by another user or to a question posed from within the media item).

When a user of client device 110 provides input for a comment, comment creator 113 creates a comment data item. Initially, a comment data item that comment creator 113 creates is stored locally on client device 110. The comment data item may be stored in volatile memory or non-volatile memory.

In addition to the actual (text or audio) data that comprises a comment, a comment data item may include (or is otherwise associated with) an identity of the user that initiated creation of the comment (or "author"), an identity of the client device through which the comment data item was created, an identity of the media item with which the comment is associated, a type of comment (e.g., statement, question, or answer), a media time (within a timeline of the media item) with which the comment is associated, and/or a duration.

A media time that is associated with a comment may be determined in one of multiple ways. For example, while viewing playback of a video item, a user provides input to pause or stop playback of the video item. In response, media player 112 pauses or stops playback. The user then provides text or character input that comprises a comment. Media player 112 creates a comment data item and determines the current playback position of the video item. Identification of the current playback position is stored in (or in association with) the comment data item. The identification may be a media time, such as "1:29." As another example, while listening to playback of an audio item, a user (without providing explicit input to pause or stop playback of the audio item) provides text or character input that comprises a comment. Media player 112 determines the current playback position of the audio item. The current playback position may be of when the user input began inputting the comment or when the user finished inputting the comment or sometime in between. Identification of the current playback position is stored in (or in association with) the comment data item.

In an embodiment, a media item is associated with multiple pre-defined segments. Example segments are every two minutes of media playback, regardless of the content of the media item. Therefore, if a media item is ten minutes long, then the media item would have five segments. Alternatively, segments of a media item may be based on content of the media item. For example, a video item may contain a lecture that includes multiple slides, where presentation of each slide varies based on time. Thus, some slides are displayed for longer periods of time than other slides. In this example, each slide corresponds to a different segment. Accordingly, a comment data item is stored in associated with one of the segments in addition to or alternatively to a specific time within the media item. For example, if a particular segment lasts from media times 8:12 to 10:48 and a comment is provided at media time 10:32, then, because 10:32 is between 8:12 and 10:48, media player 112 creates a comment data item for the comment and associates the comment data item with the particular segment (e.g., "Segment 3") as opposed to media time 10:32.

A comment data item may be transmitted to content provider 130 upon its creation or first stored locally and then transferred later, such as when client device 110 has established a connection with content provider 130 or when client device 110 determines that network bandwidth is greater than a particular threshold. If client device 110 buffers multiple comment data items (such as those being related to the same media item), then client device 110 may transmit them in a batch of one or more messages.

Comment Processor

Comment processor 136 receives comment data from client devices 110 and 114 and stores the comment data in comment database 138. Comment processor 136 organizes comment data items according to media item. For example, client device 110 sends two comment data items related to media item A and client device 114 sends five data items related to media item A. Comment processor 136 associates all seven comment data items with media item A, for example, by storing the seven comment data items in a table that is associated with media item A. Each separate table or file may store comment data items for a different media item stored in media content database 134.

Comment Window

Figure 2:
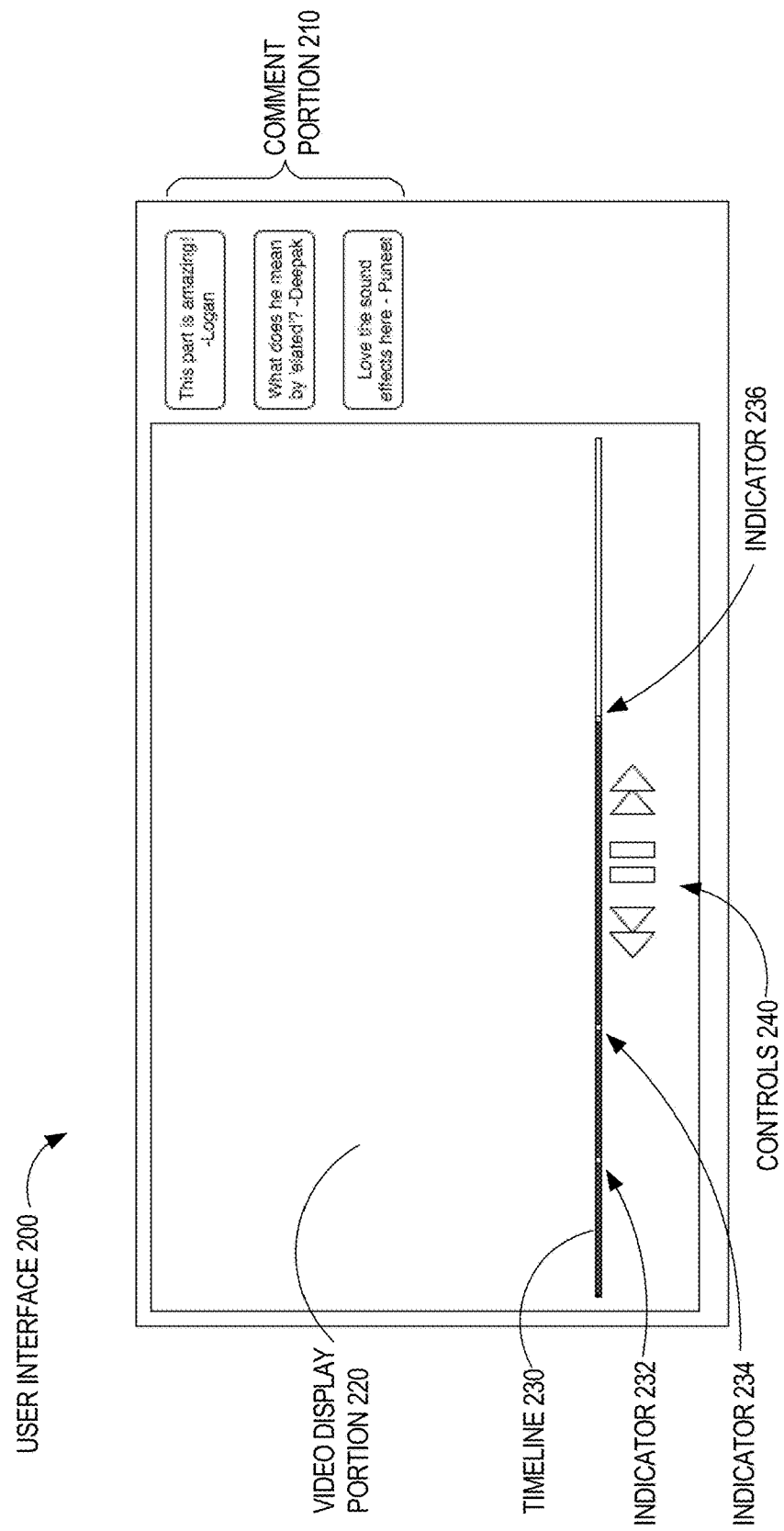
FIG. 2 is a diagram that depicts an example user interface that includes a comment window, in an embodiment.

In an embodiment, media player 112 (or an application in which media player 112 is embedded) includes a comment window for presenting comments, such as questions and answers. The comment window may be displayed on a screen of client device 110 concurrently with video that media player 112 plays. FIG. 2 is a diagram that depicts an example user interface 200, in an embodiment. User interface 200 includes a comment portion 210 that includes three comments that are associated with a single media item, a video display portion 220 where video data of the media item is presented, a timeline 230, and controls 240 to allow a user to control playback of the media item. Timeline 230 includes three indicators 232-236, each corresponding to a different set of one or more comments. In this example, current playback of the media item has reached a time corresponding to indicator 236. In response to current playback reaching that time, the three comments that are depicted are displayed in comment portion 210. Thus, prior to the current playback reaching the time corresponding to indicator 236, those three comments are not displayed in comment portion 210. Similarly, a different set of comments may have been displayed when current playback of the media item reached a time corresponding to indicator 232. Each set of comments associated with an indicator may be displayed for a period of time (e.g., ten seconds), which may be the same among all the comments or may be different for different comments. For example, four comments associated with indicator 234 are displayed until the current playback reaches a time corresponding to indicator 236, after which the four comments disappear and are replaced with the three comments depicted in FIG. 2. In an embodiment, the more comments that are displayed in comment portion 210, the longer the comments are displayed. Alternatively, each comment may be associated with a different display time, in which case some comments associated with an indicator will disappear automatically before other comments that are associated with the same indicator.

Thus, a comment window displays one or more comment data items (or just "comments" hereafter) that are associated with a media item, which may be currently loaded in media player 112. Each comment may be displayed with associated metadata, such as a name or identifier of a user who composed or initiated the comment, a particular media time or time period (in the corresponding media item) with which the comment is associated, a comment type (if multiple types are supported or tracked), whether there are any answers or "sub-comments" that pertain to the comment (which may be a question), and/or a number of answers/sub-comments associated with the comment.

In alternative embodiment, comments are displayed along a timeline that media player 112 generates to show where the current playback position is located. The timeline may be displayed over any video that is presented during playback of a media item. The timeline may appear or disappear based on user input (e.g., cursor movement) or lack thereof.

Alternatively, if a media item is a video item, then comments may be displayed over video that is being displayed. The comments may be displayed in a portion (of the view in which video is displayed) where the comments are not a significant obstruction or distraction to the important contents of the video, such as the top of the view or the bottom of the view.

User Selection of Comments

In an embodiment, user selection of a comment causes playback of a media item to jump to a position within the media item that corresponds to a media time associated with the comment. For example, if the current playback position is at media time 0:00, a user of client device 110 selects a comment that is displayed in a comment window, and the comment is associated with media time 21:20, then the current playback position is moved to media time 21:20. Media player 112 may immediately begin playing the media item beginning at that point. Alternatively, user input (e.g., selecting a graphical "Play" button) may be required to initiate playback beginning at that point.

As a similar example, if the current playback position is at media time 48:31, a user of client device 110 selects a comment that is displayed in a comment window, and the comment is associated with media time 21:20, then the current playback position is moved to media time 21:20. Again, media player 112 may immediately begin playing the media item beginning at that point (i.e., media time 21:20) or user input may be required to initiate playback beginning at that point.

In a related embodiment, if a comment is associated with a certain time period within a media item, then media player 112 automatically plays that portion of the media item and pauses playback when the time period ends. For example, a comment is associated with media times 9:32 and 11:48. User selection of the comment causes media player 112 to begin playing at media time 9:32 and end playing at 11:48, without requiring any additional user input.

Dynamic Comments

Media player 112 displays (e.g., in a comment window) one of at least two types of comments: "static" comments or "dynamic" comments. A static comment is a comment that does not change during playback of the corresponding media item. Thus, for example, a static comment is one that is displayed throughout playback of the media item. However, time data (e.g., "3:50") may be displayed adjacent to a static comment to inform a viewer of the static comment regarding which media time(s) the static comment is associated.

A dynamic comment is one that changes during playback of the corresponding media item. A dynamic comment is dynamic in one or more ways. A comment may be dynamic in when the comment is displayed, when the comment is highlighted, or when data associated with the comment is displayed or highlighted. The dynamic nature of a comment is due to the media time(s) associated with the comment.

In an embodiment, the comment window displays comments dynamically based on playback of a media item with which the comments are associated. For example, a particular comment that was created by media player 112 is associated with media time 1:12 of a media item. Later, a user of client device 114 provides input that causes media player 116 to request the media item from content provider 130. Media player 116 plays the media item beginning from the start of the media item. While media player 116 plays the media item, media player 116 provides a comment window that is initially empty because no comments have been associated with the beginning of the media item. Prior to media time 1:12, the particular comment is not displayed in the comment window. When the current playback media time is 1:12, the particular comment is displayed in the comment window.

In an embodiment, a dynamic comment is displayed during playback of the corresponding media item even though the current playback time has not reached the video time associated with the dynamic comment. However, when the current playback time is the same as the video time associated with the dynamic comment, the dynamic comment is highlighted. Any technique for highlighting the comment may be used, including underlining, italicizing, bolding, changing font color, changing background color, and/or displaying a graphic adjacent to the comment. Any technique for indicating that the comment is associated with the current playback time of the media time may be used.

Automatically Pause Playback

In an embodiment, the determination to display/highlight a comment (whether static or dynamic) causes playback of the corresponding media item to stop. For example, a comment is associated with a video time of 8:33 within a video item. During playback of the video item, media player 112 determines that the current playback time of the video item is 8:33 and that the comment is associated with that video time. In response, media player 112 pauses or stops playback of the video item. Media player 112 may automatically resume playback of the video item after a certain period of time or may wait for user input to resume playback. In this way, a consumer (e.g., a viewer) of the media item is notified that a comment or question is associated with the current playback position and has time to read the question before proceeding.

In an embodiment, the length of the pause before playback is resume automatically varies based on the length of the comment, the number of sub-comments (e.g., answers if the comment is a question), the length of the sub-comments, and/or a combination of the three. For example, if a comment is twenty words, then playback is resumed after a 10 second pause. If a comment is over three hundred words, then playback is resumed after two minutes. In this way, a viewer of the comments has time to read the comment and any sub-comments before playback automatically resumes. Additionally, media player 112 (or content provider 130) may determine to pause playback indefinitely if a comment is greater than a certain number of characters or words or if the number or length of sub-comments is greater than a certain threshold.

Time Period

In an embodiment, a dynamic comment is associated with a user-defined period of time, such as from media time 5:25 to media time 6:07. In that case, the dynamic comment is highlighted or displayed for only that period of time during playback of the corresponding media item.

In a related embodiment, a time period is automatically determined. For example, a user defines a start time, such as by (a) beginning to type a comment at a particular time within the corresponding media item, (b) first pausing playback of the media item and then typing a comment, or (c) manually specifying the start time when composing the comment. If no end time is indicated (or regardless if one is indicated or not), then media player 112 or comment creator 113 specifies a default time period, such as 5 seconds, 10 seconds, or 1 minute. Additionally or alternatively, media player 112 determines how long a dynamic comment will be displayed or highlighted, such as 5 seconds, 10 seconds, or 1 minute when it is time to display the comment or highlight the (already displayed) comment.

Questions and Answers

In an embodiment, a comment window includes one or more questions. The comment window may indicate whether each question is associated with any answers (or may even indicate the number of answers). Questions and answers may originate from different users and client devices. Each answer is associated with at least one question. Initially, a comment window only displays the one or more questions without displaying any answers. In this case, user selection of a question causes one or more answers to be displayed (if the question is indeed associated with one or more answers).

In an embodiment, a comment window that includes one or more questions allows a user to provide an answer to one of the question(s). Thus, the comment window may include one or more graphical elements that allow the user to provide text input or voice input that is translated into text. Regardless of the type of input, a result of the input is stored in association with the selected question as an answer to the question.

In an embodiment, one or more answers of a question are dynamic, regardless of whether the question is dynamic. For example, a question is displayed during playback of the corresponding media item even though the current playback time has not reached the media time associated with the question. However, when the current playback time is the same as the media time associated with the question, one or more answers associated with the question are displayed. In a related example, one or more answers of a question are displayed even though the current playback time has not reached the media time associated with the question. However, when the current playback time is the same as the media time associated with the question, the one or more answers are highlighted.

In an embodiment, an answer is automatically associated with a particular time that is associated with the question to which the answer corresponds. Therefore, a user's media player is not required to be at a particular playback position that corresponds to the particular time when providing input that comprises the answer. Instead, the current playback position may be at a time that is very different than the particular time. Also, the user is not required to provide input that specifies the particular time. Therefore, a second user's selection of the answer (i.e., that was composed by a first user) may cause a playback position of the second user's media player to jump to the particular time and, optionally, begin playing at that point.

In an embodiment, an answer is associated with a first time that is different than a second time that is associated with the question to which the answer corresponds. For example, a question is associated with time 1:23 in a timeline of an audio file and an answer to the question is associated with time 2:54 in the timeline. This embodiment is useful if information about the answer is corroborated or elaborated with content beginning at time 2:54. For example, a first user may have a question after listening to the first 1 minute and 23 seconds of the audio file. A second user may determine that an answer to the question is found beginning at time 2:54. The time associated with the answer may be determined (a) automatically based on the current playback position of the second user when the second user provides input that comprises the answer or (b) manually by allowing the second user to specify a time for the answer.

Sources of a Comment

A comment (e.g., question or answer) associated with a media item may originate from one or more consumers (or end-users) of the media item or from a content creator of the media item. Thus, a comment window may indicate not only an identity of the user who posted or composed the comment, but also may indicate whether the comment is from a content creator or another consumer. Any technique for visually differentiating a consumer comment from a content creator comment may be used. For example, a content creator comment may be bolded, underlined, or italicized, have a different font style or color, and/or have a visual graphic that is displayed adjacent to the comment. In this way, consumers of a media item are made aware that some comments may be more important than others.

Different Modes

In an embodiment, media player 112 has multiple modes, such as a static mode, a highlight mode, a dynamic display mode, and/or a pause mode. In static mode, media player 112 displays (e.g., in a comment window) static comments, i.e., those that do not change during playback of the corresponding media item. In highlight mode, media player 112 continuously displays (e.g., in a comment window) comments where the comments are highlighted when the current playback time reaches the associated media times. In dynamic display mode, media player 112 displays a comment only during a period of time that is based on one or more media times associated with the comment.

In pause mode, media player 112 pauses playback of a media item when the current playback time is the same as (or near) a media time associated with a comment. Media player 112 may require user input to continue playing the media item. Additionally or alternatively, media player 112 continues playing the media item after a certain period of time (e.g., user configurable or pre-defined) has lapsed since playback was paused. For example, if no user input is received after 10 seconds of a pause of a video item, then media player 112 continues playing the video item beginning from where playback was located when the pause occurred.

Media player 112 may be in multiple modes simultaneously. For example, media player 112 is in the highlight mode and the pause mode at the same time. Thus, for example, when a media time associated with a question is the same as the current playback time of a video item, then playback of the video item pauses and the question is highlighted in a comment window provided by media player 112.

Multiple Media Item View

In an embodiment, multiple media items are identified in a single view. The single view may be provided to client devices 110 and 114 or may be viewable only by creators of the identified media items. For example, a user may submit, from client device 110, to content provider 130, a request for one or more media items. A request may include one or more filtering criteria that content provider 130 uses to identify a subset of media items stored in media item database 134. Examples of time-related filtering criteria include a single date, a time, and/or a period of time. Examples of media-related filtering criteria include whether or when a media item was modified, when a media item was created, when a media item was uploaded to content provider 130, and whether, when, and/or frequency with which a media item has been commented (or been associated with questions and/or answers). For example, a request may request to view information about all video items that have been uploaded to content provider 130 before September 20. As another example, a request may request to view information about all video items with which viewers have associated at least fifty comments in the last two days.

If the user initiating the request is a representative of a particular content creator and content provider 130 stores media items from other content creators, then the request may request all media items from (or associated with) that particular content creator, subject to zero or more filtering criteria.

In an embodiment, each media item in a view of multiple media items is associated with data that indicates information about comments, questions, or answers associated with the media item. For example, adjacent to each media item identifier (that identifies the media item relative to other media items in a view), one or more of the following information about each media item is displayed: a number of comments, a number of questions, a number of answers, a number of statements, a number of questions that are not associated with any answers, a number of questions that are associated with at least one answer, a number of questions from creator(s) of the media item, and a number of questions from non-creators of the media item (e.g., students of an online course).

Searching Comments

Comment searcher 138 receives search queries for comments that are stored in association with a single media item or for comments that may be stored in association with one of multiple media items. For example, comment searcher 138 identifies two comments that satisfy a search query and sends information about the two comments to a media player 112.

In an embodiment, media player 112 includes a search interface that allows a user of client device 110 to provide a search query of one or more words or characters that are used to identify zero or more comments within a media item. In one embodiment, media player 112 performs the search locally, indicating that all the comments (at least with respect to a particular media item) are stored locally on client device 110. In an alternative embodiment, media player 112 sends the search query over network 120 to content provider 130 and comment searcher 138 includes a search feature that allows a user of client device 110 to search for comments associated with a single media item.

A search for comments includes one or more search criteria. A search criterion may be a default search criterion or a user-specified search criterion. Examples of search criteria include a creation time of a comment, a posting time of a comment (or time when the comment was made public with the corresponding media item, which time may be different than when the comment was created), a selection time of a comment (or when the first or last user viewer selected the comment), a view time of a comment (or when the first or last user viewer viewed the comment), a media time duration (e.g., between media times 3:41 and 5:02) in which the comment is associated, an identity (or classification) of an author of the comment, content of the comment (e.g., one or more words or phrases in the comment), a number of sub-comments (or answers) associated with the comment, and an identity (or classification) of an author of a sub-comment of the comment. For example, a search may be for any question where an author of a question is a student, an answer of that question is a particular instructor, and that question was previously selected before November 1 by the user initiating the search.

In an embodiment, identification of a comment as a result of performing a search causes the current playback position in a media item to be moved to a media time that is associated with the comment. For example, a particular question is associated with video time 4:39 when a search across comments associated with a video item is performed, where the search comprises the phrase "linear regression." If the current playback position of media player 112 is 0:00 (or some other position within the video item) when the search is performed, then, upon identifying the particular comment, media player 112 automatically moves the current playback position to video time 4:39. Media player 112 may automatically begin playing the video item from that point or may wait for user input before playing the video item.

In an embodiment, a search of comments is performed based on a current playback position of a media item. For example, a viewer is watching video that media player 112 displays by playing a video item. While the video item is played or after media player 112 pauses or stops playing the video item, the viewer provides input that causes media player 112 (or a component of content provider 130) to perform a search of comments that are associated with the video item and the current playback position, such as media time 4:12. The search may identify comments that are associated with media times that are within a certain time range of the current playback position, such as two minutes before media time 4:12 and two minutes after media time 4:12, or just one minute before media time 4:12. As another example, a (e.g., pre-defined) segment of the video item is identified (e.g., between media times 3:00 and 5:00) based on the current playback position, and then all comments that are associated with that segment are identified and at least a subset is displayed.

In an embodiment, the search feature is combined with the user selection of a comment feature to allow users to search for relevant comments and then view corresponding portions of a video item. For example, a user initiates a search for answers that are from a particular author and that were created after December 3. Media player 112 displays multiple answers that satisfy the search criteria. The user then selects one of the answers, which causes the corresponding media item to play beginning from a media time associated with the selected answer.

In an embodiment, a search may involve searching for comments that are associated with different media items. For example, a search criterion may be the word "propagation." Comments associated with media item A and comments associated with media item B are searched to identify any comment that includes the word "propagation" and that satisfy other search criteria (if any). When results of the search are displayed (e.g., in a comment window), each result corresponds to a different comment and may indicate a particular media item with which the comment is associated, along with any media time data that is associated with the comment. Therefore, users are able to search for media items, video or audio, by searching for comments. For example, there may be comments in multiple video items with the keyword "hilarious" and a user could initiate a search for that keyword to find what video item to play based on the comments matching that keyword.

Example Process

Figure 3A:
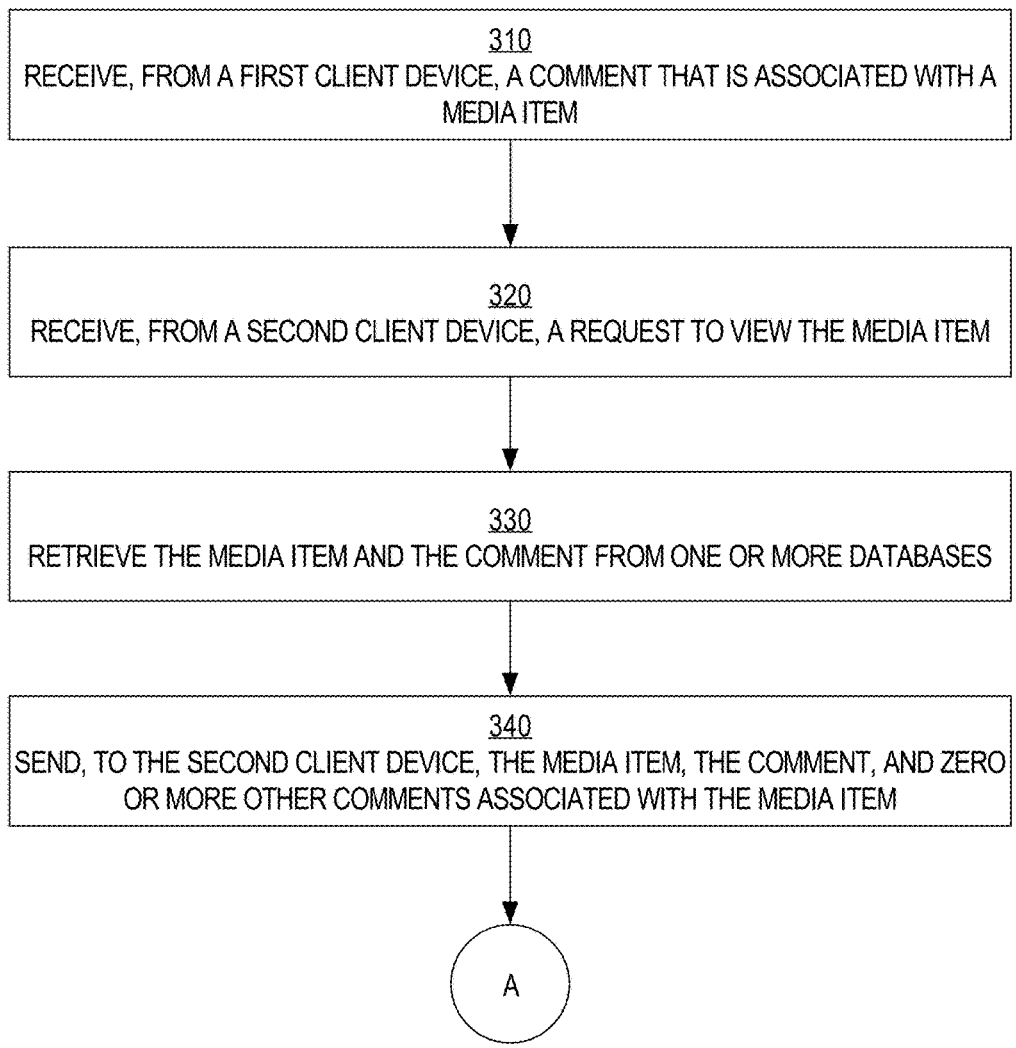
FIGS. 3A-3B are flow diagrams that depict a process for processing comment data with respect to a media item, in an embodiment.
Figure 3B:
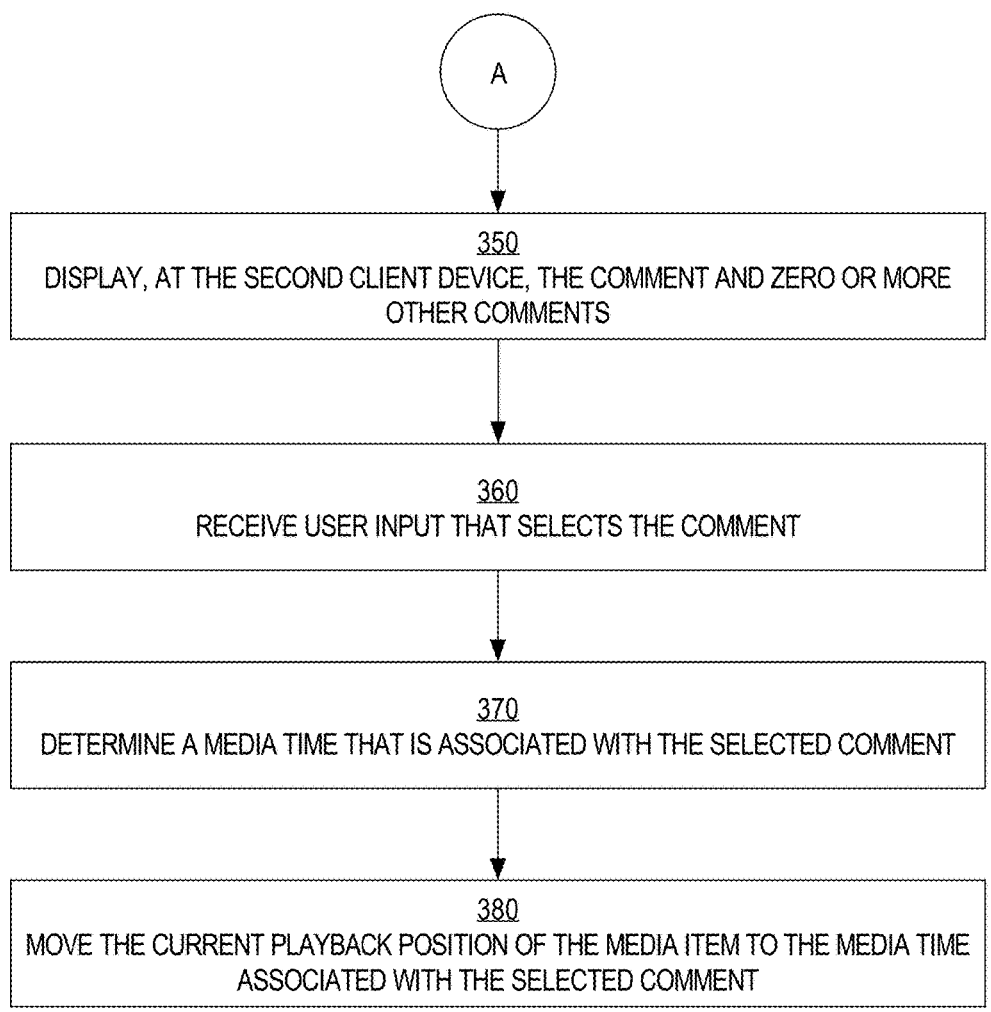

FIGS. 3A-3B are flow diagrams that depict a process 300 for processing comment data with respect to a media item, in an embodiment. Process 300 is described in the context of system 100 in FIG. 1. FIG. 3A corresponds to actions performed by content provider 130 and FIG. 3B corresponds to actions performed on client device 114.

At block 310, comment processor 136 receives, from client device 110, a comment generated by media player 112. Block 310 may involve comment processor 136 storing the comment in comment database 138. The comment is stored in association with data that identifies a media item. The comment may be assigned an identifier that uniquely identifies the comment relative to other comments associated with the media item. Either media player 112 generates the identifier or comment processor 136 generates the identifier. The identifier may be based on a user identifier (of a user of client device 110) or a device identifier (of client device 110 or software executing thereon). The comment generated by media player 112 may include time data that indicates one or more points within the media item's timeline. Alternatively, the time data arrives separate from (but associated with) the comment.

At block 320, request processor 132 receives, from client device 114, a request to view the media item that is associated with the comment received in block 310. Alternatively, the request may be to view any comments that are associated with the media item, where the media item is already loaded on client device 114.

At block 330, request processor 132 causes the media item to be retrieved from media content database 134 (if applicable) and one or more comments that are associated with the media item to be retrieved from comment database 138. The one or more comments include the comment received from client device 110.

At block 340, request processor 132 sends, over network 120 to client device 114, the media item and/or the one or more comments.

At block 350, media player 116 causes the one or more comments to be displayed. Block 350 may be performed automatically in response to receiving the one or more comments from content provider 130. Alternatively, block 350 may be performed in response to receiving explicit user input to display the one or more comments. If block 340 involves only sending the media item, then block 330 may not involve retrieving the one or more comments and block 350 may involve media player 116 sending, to content provider 130, a request for any comments that are associated with the media item. Such a request includes a media item identifier that uniquely identifies the media item relative to other media items stored in media content database 134.

At block 360, a user of client device 114 provides input that selects the comment. Block 360 may involve a user pressing her finger on a portion of a touchscreen of client device 114 where the comment is displayed. Alternatively, block 360 may involve the user using a computer mouse to place a cursor over the comment and then selecting a mouse button.

At block 370, media player 116 determines a media time or segment that is associated with the selected comment. If the media time or segment data accompanies the one or more comments sent in block 340, then block 370 may involve reading the media time or segment data from local storage. However, if the media time or segment data did not accompany the one or more comments sent in block 340, then block 370 may involve media player 116 sending, over network 120 to content provider 130, a request to retrieve the media time or segment data. The request may include a comment identifier that uniquely identifies the comment relative to other comments that may be associated with the same media item.

At block 380, media player 116 causes the current playback position of the media item to skip to the media time (or segment) that is associated with the selected comment. Media player 116 may begin automatically playing the media item at that media time or segment or may wait for explicit user input to begin playing the media item at that media time or segment.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
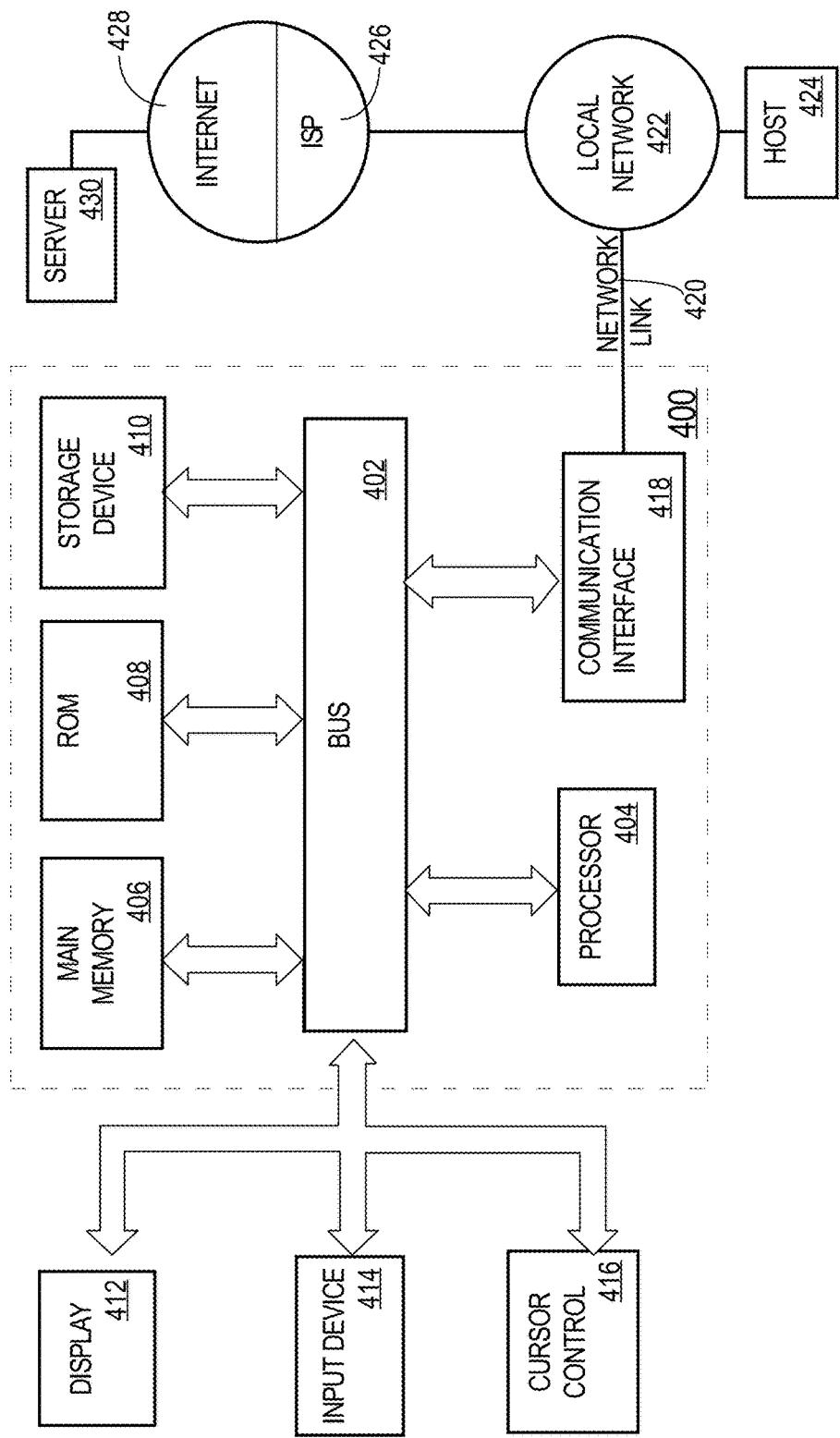
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing comment data that indicates a plurality of comments that are associated with a media item;
   wherein two comments in the plurality of comments are from different users of a plurality of users;
   wherein each comment in the plurality of comments is associated with a time within the media item;
   receiving first input that indicates one or more search criteria;
   in response to receiving the first input:
      performing a search of the plurality of comments based on the one or more search criteria,
      wherein performing the search of the plurality of comments comprises limiting the search to comments that are associated with (1) the one or more search criteria and (2) a time that is within a time range that is based on a current playback position of the media item;
      identifying, as a result of performing the search, one or more comments of the plurality of comments;
   in response to identifying the one or more comments as the result of performing the search, causing, to be displayed on a screen of a computing device, the one or more comments of the plurality of comments;
   wherein the method is performed by one or more computing devices.

2. The method of claim 1, wherein the one or more search criteria comprises one or more words and the search comprises comparing the one or more words to content of each comment of multiple comments.

3. The method of claim 1, further comprising:
   while playing the media item:
      identifying a current time of a second current playback position of the media item;
      comparing the current time to times associated with multiple comments of the plurality of comments;
      in response to determining that the current time corresponds to a particular time associated with a particular comment, causing the particular comment to be displayed.

4. The method of claim 1, further comprising:
   while playing the media item and while displaying a particular comment of the plurality of comments that are associated with the media item:
      identifying a current time of a second current playback position of the media item;
      comparing the current time to a particular time associated with the particular comment;
      in response to determining that the current time corresponds to the particular time associated with the particular comment, causing the particular comment to be highlighted.

5. The method of claim 1, the method further comprising:
   in response to receiving third input:
      creating a particular comment,
      determining a certain time that is associated with a second current playback position of the media item,
      associating the particular comment with the certain time.

6. The method of claim 1, wherein the one or more search criteria indicate a number of sub-comments associated with a comment.

7. The method of claim 1, wherein the one or more search criteria indicate an identity or classification of an author of a comment or a sub-comment of the comment.

8. The method of claim 1, further comprising:
   in response to identifying the one or more comments as the result of performing the search, causing the current playback position of the media item to move to a position that corresponds to a media time that is associated with one of the one or more comments.

9. The method of claim 1, wherein:
   the media item comprises a plurality of segments;
   the current playback position of the media item is within a particular segment of the plurality of segments;
   the time range corresponds to the particular segment.

10. The method of claim 1, further comprising:
    receiving second input that indications user selection of a first comment in the one or more comments;
    in response to receiving the second input:
       identifying a particular time that is associated with the first comment,
       identifying, within the media item, a location that corresponds to the particular time.

11. The method of claim 10, further comprising, in response to receiving the second input, causing the media item to play beginning at the location.

12. A method comprising:
    storing comment data that indicates a plurality of comments that are associated with a media item;
    wherein each comment in the plurality of comments is associated with a time within the media item;
    receiving one or more search criteria;
    in response to receiving the one or more search criteria:
       performing a search of the plurality of comments based on the one or more search criteria,
       identifying, as a result of performing the search, one or more comments of the plurality of comments;
    in response to identifying the one or more comments as the result of performing the search, causing, to be displayed on a screen of a computing device, the one or more comments of the plurality of comments;

causing to be displayed, on the screen of the computing device, a question that is associated with a first time within a timeline of the media item, wherein the question is a comment of the plurality of comments;
receiving input that indicates an answer to the question;
in response to receiving the input:
associating the answer with a second time, within the timeline, that is different than the first time, and
storing the answer in association with the question;
wherein the method is performed by one or more computing devices.

13. A system comprising:
one or more processors;
one or more storage media carrying instructions which, when executed by the one or more processors, cause:
storing comment data that indicates a plurality of comments that are associated with a media item;
wherein two comments in the plurality of comments are from different users of a plurality of users;
wherein each comment in the plurality of comments is associated with a time within the media item;
receiving first input that indicates a particular time;
wherein the particular time is one of:
a selection time indicating when a comment was first or last selected by a user, or
a view time indicating when a comment was first or last viewed by a user
in response to receiving the first input:
performing a search of the plurality of comments based on the particular time,
identifying, as a result of performing the search, one or more comments of the plurality of comments that are associated with the particular time;
in response to identifying the one or more comments as the result of performing the search, causing, to be displayed on a screen of a computing device, the one or more comments of the plurality of comments;
receiving second input that indications user selection of a first comment in the one or more comments;
in response to receiving the second input:
identifying a first time that is associated with the first comment,
identifying, within the media item, a location that corresponds to the first time,
causing a playback position of a media player to move to the location.

14. The system of claim 13, wherein the instructions, when executed by the one or more processors, further cause, in response to receiving the second input, causing the media item to play beginning at the location.

15. The system of claim 13, wherein the instructions, when executed by the one or more processors, further cause:
while playing the media item:
identifying a current time of a current playback position of the media item;
comparing the current time to times associated with multiple comments of the plurality of comments;
in response to determining that the current time corresponds to a certain time associated with a particular comment, causing the particular comment to be displayed.

16. The system of claim 13, wherein the instructions, when executed by the one or more processors, further cause:
while playing the media item and while displaying a particular comment of the plurality of comments that are associated with the media item:
identifying a current time of a current playback position of the media item;
comparing the current time to a certain time associated with the particular comment;
in response to determining that the current time corresponds to the certain time associated with the particular comment, causing the particular comment to be highlighted.

17. The system of claim 13, wherein the instructions, when executed by the one or more processors, further cause:
while playing the media item and while a particular comment is displayed on the screen of the computing device:
identifying a current time of a current playback position of the media item;
comparing the current time to a certain time associated with the particular comment;
in response to determining that the current time corresponds to the certain time associated with the particular comment, ceasing to display the particular comment on the screen of the computing device.

18. The system of claim 13, wherein the instructions, when executed by the one or more processors, further cause:
in response to receiving third input:
creating a particular comment,
determining a certain time that is associated with a current playback position of the media item,
associating the particular comment with the certain time.

19. The system of claim 13, wherein the instructions, when executed by the one or more processors, further cause:
in response to receiving third input:
creating a particular comment;
identifying, based on a current playback position of the media item, a particular segment of a plurality of pre-defined segments of the media item;
associating the particular comment with the particular segment.

20. The system of claim 13, wherein the instructions, when executed by the one or more processors, further cause:
while playing the media item:
identifying a current time of a current playback position of the media item;
comparing the current time to times associated with multiple comments of the plurality of comments;
in response to determining that the current time corresponds to a certain time associated with a particular comment, causing playback of the media item to pause;
causing playback of the media item to resume automatically based on one or more criteria associated with the particular comment;
wherein the one or more criteria includes a length of the particular comment, a number of sub-comments of the particular comment, or a length of the sub-comments of the particular comment.

21. A system comprising:
one or more processors;
one or more storage media storing instructions which, when executed by the one or more processors, cause:
storing comment data that indicates a plurality of comments that are associated with a media item;
wherein two comments in the plurality of comments are from different users of a plurality of users;
wherein each comment in the plurality of comments is associated with a time within the media item;
while playing the media item:

identifying a current time of a current playback position of the media item;

comparing the current time to times associated with multiple comments of the plurality of comments;

in response to determining that the current time corresponds to a particular time associated with a particular comment, causing playback of the media item to pause;

determining a length of time to pause the media item based on one or more criteria associated with the particular comment;

automatically causing playback of the media item to resume after the length of the time has elapsed;

wherein the one or more criteria includes a number of words or characters in the particular comment, a number of sub-comments of the particular comment, or a length of the sub-comments of the particular comment.

* * * * *